(12) United States Patent
Stokes

(10) Patent No.: US 6,938,008 B1
(45) Date of Patent: Aug. 30, 2005

(54) LOAN MODELLER METHOD AND APPARATUS

(75) Inventor: Christopher John Stokes, Bracknell (GB)

(73) Assignee: Fujitsu Services Limited, Slough (GB)

( * ) Notice: Subject to any disclaimer, the term of this patent is extended or adjusted under 35 U.S.C. 154(b) by 785 days.

(21) Appl. No.: 09/665,769

(22) Filed: Sep. 20, 2000

(30) Foreign Application Priority Data

Dec. 10, 1999 (GB) .................................... 9929114

(51) Int. Cl.[7] ........................................... G06F 17/60
(52) U.S. Cl. ........................................ 705/35; 705/38
(58) Field of Search .................................... 705/38, 35

(56) References Cited

U.S. PATENT DOCUMENTS

| | | | |
|---|---|---|---|
| 5,058,009 A | | 10/1991 | Yoshino .................... 364/408 |
| 5,237,500 A | * | 8/1993 | Perg et al. .................... 705/35 |
| 5,699,527 A | * | 12/1997 | Davidson .................... 705/38 |
| 5,742,775 A | * | 4/1998 | King ............................ 705/38 |
| 5,765,144 A | | 6/1998 | Larche et al. |
| 5,991,745 A | * | 11/1999 | Kiritz .......................... 705/38 |

OTHER PUBLICATIONS

Weber, Dick; Nontraditional schdules keep interest from hitting the roof, Real Estate Today, v23, n1, p44(45).*
Whitacre, David B. Resurrecting Special Forbearance Mortgage Banking v53n2 pp.; 85-87 Nov 1992.*
Zearley, Thomas, Alternative Mortgage Instruments and Lender Risks, Bankers Magazine v164n6 pp.; 61-64 Nov./Dec. 1981.*
Alternative Mortgage Instruments are Building Savings & Loan News V98 N8 pp.; 50-55 Aug. 1977.*
Clydesdale Bank: Clyd sdale Bank provides fresh stimulus to housing market M2 Presswire, Nov. 8, 1995.*
"New Mortgage Plan Offered" (Real Estate Weekly, 47, 2, 29) Aug. 9, 2000.*
Lease Calculator! Plus v2.6 by Pine Grove Software.
Loan Calculator! Plus v.2.1c by Pine Grove Software.
AmortizeIT! v2.1 by Pine Grove Software.
SolveIT! by Pine Grove Software.
Mortgage Designer v4.2 by MaeDae.
Mortgage Calculator facility.
Cude, "Home Ownership: Can You Afford It?", XP 000613423, Jun. 2, 1994.

* cited by examiner

*Primary Examiner*—Jagdish N Patel
(74) *Attorney, Agent, or Firm*—Barnes & Thornburg

(57) ABSTRACT

A method for modelling loans comprises allowing a user to enter parameters relevant to the loan, including the loan amount, loan term and interest rate, and then visually displaying information indicating the repayments due over the term of the loan. The user can also select one or more of the following options: low-start or fast-start loans; regularly increasing repayments; lump sum repayments at specified dates; reduced repayments for a specified period; and variable repayments over different months of the year. The information indicating the repayments due over the term of the loan is displayed in some easily-understandable visual representation, such as a graph, bar chart, or table.

8 Claims, 2 Drawing Sheets

US 6,938,008 B1

LOAN MODELLER METHOD AND APPARATUS

BACKGROUND TO THE INVENTION

This invention relates to a computer-implemented method and apparatus for modelling loans, such as for example home finance loans. More specifically, the invention is concerned with enabling users to model the implications of different repayment profiles.

It is well known to use a computer to calculate repayments on a loan, given basic parameters such as loan amount, loan term, and interest rate. Such a facility has been made available over the Internet, to enable users to investigate various "what-if" scenarios, and to assist them in deciding which loan is best suited to their needs.

The object of the present invention is to provide an improved method and apparatus for modelling loans, which provides more flexibility than known methods and apparatus.

SUMMARY OF THE INVENTION

According to the invention a computer-implemented method for modelling loans, the method comprises:
(a) enabling a user to enter parameters relevant to a loan, the parameters including loan amount and loan term;
(b) enabling the user to specify a number of options relevant to the loan, the options including at least one of the following:
  low-start or fast-start loans,
  regularly increasing repayments,
  reduced repayments for a specified period, and
  variable repayments over different months of the year;
(c) computing repayments due over the term of the loan, based on the parameters and options entered by the user; and
(d) visually displaying information indicating the repayments due over the term of the loan.

It will be seen that the invention thus allows the user considerable flexibility in remodelling the loan with different repayment profiles, to see the implications of different decisions.

The information indicating the repayments due over the term of the loan may conveniently be displayed in some easily-understandable visual representation, such as a graph, bar chart, or table.

DESCRIPTION OF AN EMBODIMENT OF THE INVENTION

One method and apparatus for modelling loans in accordance with the invention will now be described by way of example with reference to the accompanying drawings.

Figure 1:
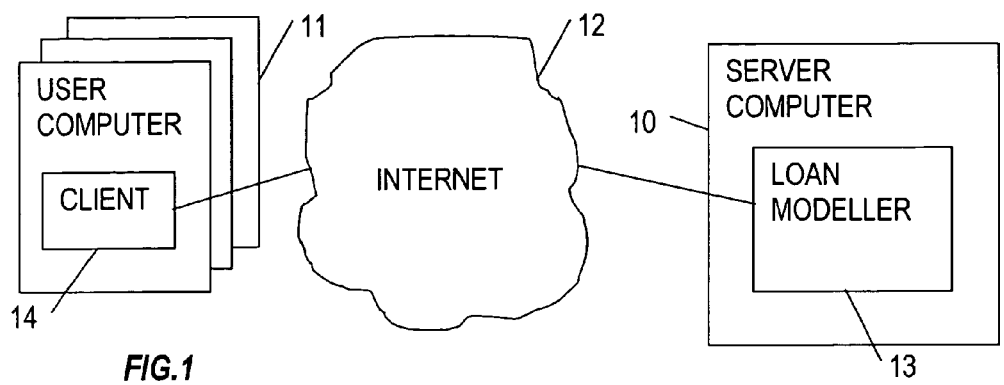
FIG. 1 is a block diagram of a computer system for implementing a loan modelling method.

Referring to FIG. 1, this shows a server computer 10 and a number of user computers 11, interconnected by the Internet 12 or by a dedicated Intranet. The server contains a loan modeller application 13, which may be implemented using Active Server Pages (ASP). Each user computer contains a client application 14, which in this example is a conventional web browser, providing access to the loan modeller application 13.

The server computer 10 may, for example, be operated by a bank or other financial services institution, as a service to customers or potential customers. The user computers 11 may be personal computers belonging to individual customers, or may be operated by agents or financial advisors. Alternatively, users may access the loan modeller application by way of a computer kiosk or Automated Teller Machine ATM.

When the loan modeller application is started, it displays an initial screen, including the following items:
  A box allowing the user to enter the loan amount.
  A pair of drop-down menus, allowing the user to specify the loan period, in years and months.
  A drop-down menu allowing the user to select an interest rate option. Interest rate options may include a standard variable rate option, and one or more fixed-rate options, in which interest is fixed at a specified rate until a specified date.

Figure 2:
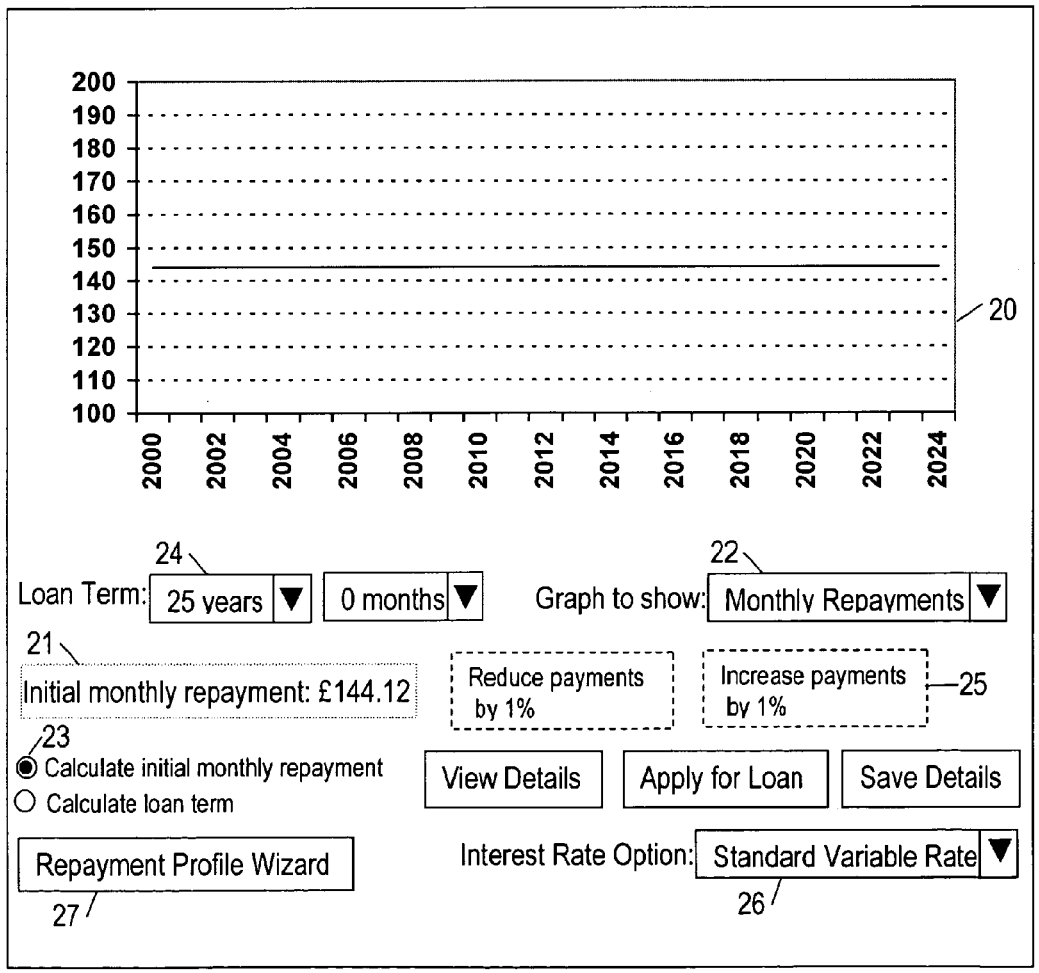
FIG. 2 is a representation of a main screen displayed to the user, including a graph.

The initial screen contains a button labelled "Start Modelling". Clicking on this button causes the loan modeller application to calculate the repayments for the loan, in the conventional manner, and then to display a main screen, as illustrated in FIG. 2.

The main screen includes a graph 20, which displays the results produced by the loan modeller, for viewing by the user. The initial monthly repayment is displayed in a text box 21. A drop-down menu 22 enables the user to select one of the following options for the graph 20:
  Monthly repayments. When this option is selected, the graph 20 displays the repayments in each month over the term of the loan, as shown in FIG. 2. The loan repayments are initially the same for each month over the entire term of the loan, and so the graph is initially simply a straight line parallel to the time axis.
  Loan balance. In this case, the graph 20 displays the balance of the loan in each month over the entire term of the loan.
  Interest charges. In this case, the graph 20 displays the interest charges in each month over the entire term of the loan.
  Cumulative interest. In this case, the graph 20 displays the cumulative interest charges in each month over the entire term of the loan.
  Cumulative repayments. In this case, the graph 20 displays the cumulative repayments in each month over the entire term of the loan.

The main screen also contains a pair of selection buttons 23, which enable the user to select between two modes:
  Calculate initial monthly repayment. In this mode, the user can specify the loan term, in years and months, using a pair of drop-down menus 24. When the loan term is changed, the loan modeller application calculates the effect of this change, and displays the results in the graph 20 and in the text box 21 as described above. In this way, the user can explore the effect of varying the loan term.
  Calculate loan term. In this mode, two additional buttons 25 are displayed on the main screen, one labelled "reduce repayments by 1%" and the other labelled "increase repayments by 1%". If the user clicks on either of these buttons, the loan modeller application calculates the effect of the specified change in monthly repayments, and displays the results on the graph 20, and in the text box 21. Thus, it can be seen that this option provides a simple way for the user to explore the effects of varying the repayments.

The main screen also includes a drop-down menu 26, which enables the user to select one of a number of interest rate options, as specified above. Using these menus, the user can explore the effect of changing the interest rate option.

The main screen also includes a "Repayment Profile Wizard" button 27. Clicking on this button calls up an entry screen, containing text as follows:

Visual Loan Modeller—Repayment Profile Wizard

The Visual Loan Modeller Repayment Profile Wizard is designed to guide you through setting a repayment structure across the term of your loan.

Most loans use a flat repayment structure, where you pay the same each month throughout the full term of the loan.

Whilst this is easy to understand, it does not take account of your changing circumstances—for example, the fact that your income is likely to increase over time.

This system will enable you to see the implications of different loan repayment profiles, to find one which meets your needs now and in the future.

Figure 3:
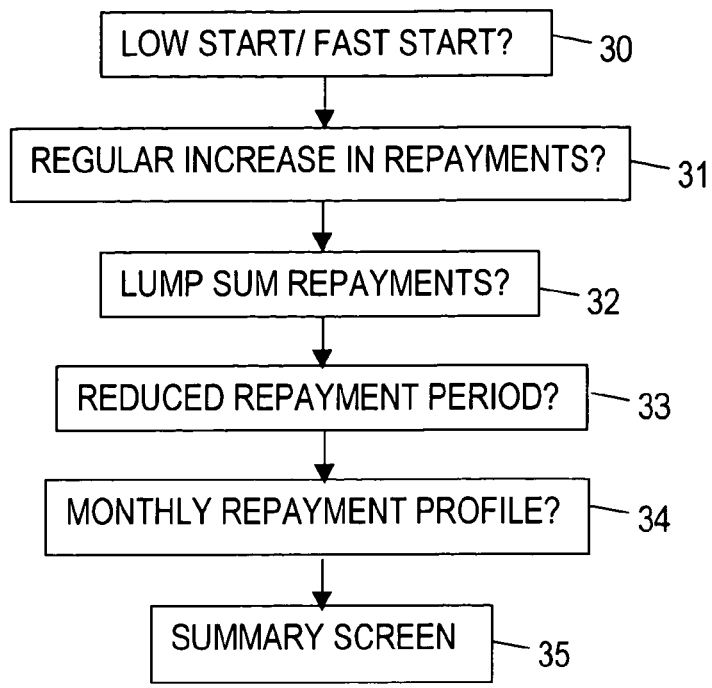
FIG. 3 is a flow chart of a repayment profile wizard.

The entry screen includes two buttons labelled "Cancel" and "Start the Wizard". Clicking on "Cancel" returns the user to the main screen. Clicking on "Start the Wizard" starts a repayment profile wizard program, which performs the following steps 30–35, as illustrated in FIG. 3.

(Step 30) The repayment profile wizard displays a screen containing the following text:

Visual Loan Modeller—Repayment Profile Wizard

Let's start by looking at the first few years of your loan. After moving into a new property, some customers like to have a time of consolidation of finances, especially after all the expenses of moving. To assist this, you may like to consider reducing your repayments during the first few years of your mortgage. This is called the low start option.

Alternatively, as the loan balance is at its highest in the first few years, most of your standard repayments go towards interest charges in these years. If you are able to increase your repayments during the first few years, this will have a significant effect in either reducing your overall repayments or reducing the term of the mortgage.

This is called the fast start option.

Would you like to model either of these scenarios?

This screen contains a drop-down menu containing the following three options:

No

Yes, low start option

Yes, fast start option.

If the user selects the low start (or fast start) option, two further drop-down menus are displayed, allowing the user to select the percentage by which repayments are to be reduced (or increased) in the early years, and the number of years for which this reduction is to be applied.

Clicking on a "Next>" button on this screen advances the repayment profile wizard to the step 31.

(Step 31) The repayment profile wizard now displays a screen containing the following text:

Visual Loan Modeller—Repayment Profile Wizard

During the term of your loan, your income is likely to rise. Most things you purchase will also rise in price due to inflation. However, usually mortgage repayments do not change over the term of the loan except due to interest rate fluctuations.

However, if you increase your repayments by a few percent each year, you can either reduce your initial repayments or repay your loan more quickly.

Would you like to model the impact of increasing your repayments?

Two selection buttons on this screen enable the user to answer "Yes" or "No" to this question. If the user selects "Yes", a drop-down menu is displayed, allowing the user to specify the percentage by which repayments are to be increased each year. Any increases will take effect after the end of any low-start or fast-start period.

Clicking on a "Next>" button on this screen advances the repayment profile wizard to the step 32.

(Step 32) The repayment profile wizard now displays a screen containing the following text:

Visual Loan Modeller—Repayment Profile Wizard

Some customers are keen to reduce their mortgage by making lump sum payments to reduce their loan balance.

This can either be a one-off payment or a series of such payments. If you are considering regular lump sum payments, you may instead like to consider changing the monthly repayment profile, whereby you can increase repayments each year in certain months e.g. to coincide with annual bonus payments.

Would you like to model the impact of making lump sum payments?

Two selection buttons on this screen enable the user to answer "Yes" or "No" to this question. If the user selects "Yes", the following items are displayed:

a drop-down menu, allowing the user to specify either a one-off payment, annual payments, or monthly payments.

a box allowing the user to enter the amount of the payment in the case of a one-off payment, a pair of drop-down menus allowing the user to specify the date of the lump sum payment.

in the case of annual or monthly payments, two pairs of drop-down menus allowing the user to specify the dates (month and year) of the first and last lump sum payments.

Clicking on a "Next>" button on this screen advances the repayment profile wizard to the step 33.

(Step 33) The repayment profile wizard now displays a screen containing the following text:

Visual Loan Modeller—Repayment Profile Wizard

If you have some big expenses coming up, such as sending a child to college, you may like to consider planning reduced payments to help your finances then.

Would you like to plan for some reduced payments in the future?

Two selection buttons on this screen enable the user to answer "Yes" or "No" to this question. If the user selects "Yes", the following items are displayed:

a drop-down menu, allowing the user to specify a percentage amount by which payments are to be reduced.

two pairs of drop-down menus allowing the user to specify start and end dates (month and year) for the period of reduced repayments.

Clicking on a "Next>" button on this screen advances the repayment profile wizard to the step 34.

(Step 34) The repayment profile wizard now displays a screen containing the following text:

Visual Loan Modeller—Repayment Profile Wizard

Rather than paying the same amount each month of the year, would you like to change your repayments in different months? For example, you could reduce your December payments to help pay for Christmas, or increase them in a month when you receive an annual bonus. If you receive seasonal income, you can reduce payments during the off season.

Just move the sliders to select your monthly repayment profile.

A set of twelve sliders on this screen enable the user to increase or decrease repayments by a specified percentage in each of the twelve months of the year.

Clicking on a "Next>" button on this screen advances the repayment profile wizard to the step 35.

(Step 35) The repayment profile wizard finally displays a screen containing a summary of all the options specified by the user.

Clicking on a "Finish" button on this screen causes the loan modeller application to recalculate the repayments, taking into account all the repayment profile options specified by the user.

The calculation is performed as follows. First, the loan modeller application allocates a monthly index for each month of the term, set initially to 1. It then goes through the fast/low start months and increases/reduces this index by the required percentage. It then implements the regular increasing option by increasing the repayment index each twelve months. Then it applies the reduced payments option. Finally all of the repayment index figures are multiplied by the monthly profile values across the whole term. The level of repayments required is then calculated by a goalseeking function altering the repayment level until the closing balance is zero.

The loan modeller application then returns to the main screen, to display the results of this recalculation. In particular, the graph 20 and the initial payment 21 are updated.

Figure 4:
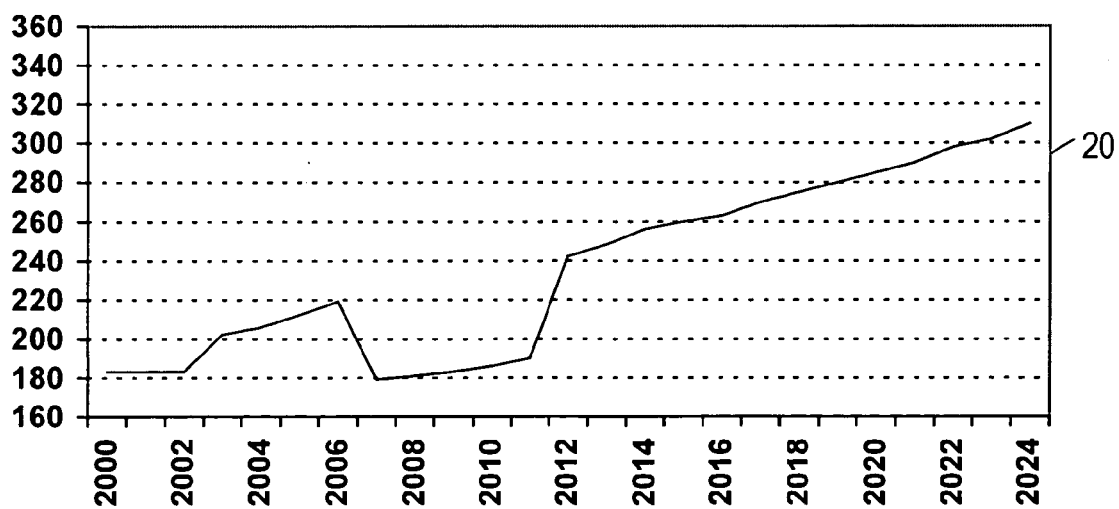
FIG. 4 shows an example of the graph after running the repayment profile wizard.

FIG. 4 shows an example of the graph 20 after running the repayment profile wizard (assuming that "monthly repayments" is selected in menu 22). It can be seen that, in this example, the user has specified the following options:

a low-start period, from 2000 up to 2002, regularly increasing payments in each year after the low-start period, and a reduced payment period from 2007 to 2011.

Each of the screens displayed in steps 30–35 above also contains a "Cancel" button. Clicking on this returns the application to the main screen without making any changes to the repayment profile. Each of the screens displayed in steps 31–35 above also contains a "<Previous" button. Clicking on this returns the repayment profile wizard to the previous step.

After the repayment profile wizard has completed, the "Repayment Profile Wizard" button 27 (FIG. 2) is replaced by a "Change Repayment Profile" button. If the user clicks on this button, a screen is displayed allowing the user to change any of the repayment profile options previously specified.

As shown in FIG. 2, the main screen also includes the following buttons:

View Details—clicking on this displays further details of the loan repayments, including the monthly repayments for each month of the loan.

Apply for loan—clicking on this allows the user to apply to the financial institution for a loan on the basis of the selected options.

Save Details—clicking on this saves the details of repayment profile options currently selected by the user.

Some Possible Modifications

It will be appreciated that many modifications may be made to the system described above without departing from the scope of the present invention. For example, although in the above description the loan modeller application is accessed over the Internet, in an alternative form of the invention, it may be a stand-alone application which can run on the user's personal computer or that of a financial services company or financial advisor, without requiring Internet access.

Whilst the application described above relates primarily to modelling new loans, alternatively the application could be run during the term of an existing loan to enable remodelling, for example to understand the implications of making lump sum payments or increasing repayments. In such a scenario, the initial balance would be the outstanding balance on the loan, the initial term would be the remainder of the existing term of the loan and the interest profile would be taken from the existing loan.

What is claimed is:

1. A computer-implemented method for modeling loans, the method comprising:
   (a) enabling a user to enter parameters relevant a loan, the parameters including loan amount and loan term;
   (b) enabling the user to specify a number of options relevant to the loan, the options including at least variable repayments over different months of the year, according to twelve user specified factors, one for each of the twelve months of the year;
   (c) computing repayments due over the terms of the loan;
   (d) visually displaying information indicating the repayments due over the term of the loan;
   wherein said computing and said displaying steps are performed using a computer.

2. A method according to claim 1 wherein the step of enabling the user to specify a number of options comprises presenting the user with a sequence of screens, each of which explains a particular option and allows the user to accept or reject that option.

3. A method according to claim 1 including the step of enabling the first user to select one of a number of interest rate options.

4. A method according to claim 1 wherein the information indicating the repayments due over the term of the loan is displayed in a visual representation including at least one of the following: a graph, a bar chart, a table.

5. A method according to claim 1 including the step of enabling the user to select one of the following options for display in respect of each month over the term of the loan: monthly repayment; loan balance, interest charge, cumulative interest, and cumulative repayments.

6. A computer system for modelling loans, comprising:
   (a) means for enabling a user to enter parameters relevant to a loan, the parameters including loan amount and loan term;
   (b) means for enabling the user to specify a number of options relevant to the loan, the options including at least
      variable repayments over different months of the year, according to twelve user, specified factors, one for each of the twelve months of the year;
   (c) means for computing repayments due over the term of the loan, based on the parameters and options entered by the user; and
   (d) means for visually displaying information indicating the repayments due over the term of the loan.

7. A computer system according to claim 6, comprising a server computer running a server application, the server application being accessible by a number of client applications over a network.

8. An information carrier holding a computer program for performing a computer-implemented method for modeling loans, the program when executed by a computer performing the method steps comprising:
  (a) enabling a user to enter parameters relevant to a loan, the parameters including loan amount and loan term;
  (b) enabling the user to specify a number of options relevant to the loan, the options including at least variable repayments over different months of the year according to twelve user specified factors, one for each of the twelve months of the year;
  (c) computing repayments due over the term of the loan, based on he parameters and options entered by the user; and
  (d) visually displaying information indicating the repayments due over the term of the loan.

* * * * *